United States Patent [19]

Camras

[11] 3,806,638

[45] Apr. 23, 1974

[54] OFFSET CARRIER RECORDING SYSTEM & METHOD

[75] Inventor: Marvin Camras, Glencoe, Ill.

[73] Assignee: ITT Research Institute, Chicago, Ill.

[22] Filed: June 24, 1971

[21] Appl. No.: 156,287

[52] U.S. Cl. ........ 178/5.6, 178/6.6 A, 179/100.2 R, 325/311, 325/345, 325/430

[51] Int. Cl. ........ H04b 1/20, H04b 1/26, H04n 5/78

[58] Field of Search ........... 178/6.6 A, 5.8 R, 5.8 A, 178/DIG. 13; 325/308, 311, 430; 179/100.2 B, 100.2 R; 325/345

[56] References Cited

UNITED STATES PATENTS

| | | | |
|---|---|---|---|
| 3,405,232 | 10/1968 | Morrow | 178/6.6 A |
| 3,110,764 | 11/1963 | Barry | 178/6.6 A |
| 3,305,782 | 2/1967 | Rosenberg | 325/345 |
| 3,350,504 | 10/1967 | Takayanagi | 178/6.6 A |
| 3,040,125 | 6/1962 | Dillenburger | 178/6.6 A |

*Primary Examiner*—Howard W. Britton
*Attorney, Agent, or Firm*—Hill, Sherman, Meroni, Gross & Simpson

[57] ABSTRACT

An offset carrier longitudinal scan recording and reproducing system for television signals wherein an amplitude modulated video signal is derived from a television receiver and converted to an offset carrier with a full upper sideband and an attenuated vestigial lower sideband. A direct or offset carrier audio signal may be recorded on the same channel with the offset carrier video signal. During monitoring and playback, the offset carrier is heterodyned to a television broadcast frequency or intermediate frequency and coupled into the television receiver. The same receiver may simultaneously supply video I.F. and audio F.M. signals for recording, and monitor offset carrier audio and video signals supplied to the recording head to facilitate recording adjustments.

34 Claims, 3 Drawing Figures

INVENTOR.
MARVIN CAMRAS

BY Hill, Sherman, Meroni, Gross & Simpson ATTORNEYS

INVENTOR.
MARVIN CAMRAS

BY Hill, Sherman, Meroni, Gross & Simpson ATTORNEYS

OFFSET CARRIER RECORDING SYSTEM & METHOD

Reference is made in compliance with the requirement of 35 U.S.C. 120 to my applications Ser. No. 528,934 filed Feb. 21, 1966 (now abandoned) and Ser. No. 545,050 filed Apr. 25, 1966 (now U.S. Pat. No. 3,484,546 issued Dec. 16, 1969), the subject matter of Ser. No. 528,934 being continued in my copending continuation application Ser. No. 62,601 filed Aug. 10, 1970 (now U.S. Pat. No. 3,683,107 issued Aug. 8, 1972), and subject matter of Ser. No. 545,050 being continued in my copending divisional application Ser. No. 889,775 filed Dec. 11, 1969 (now abandoned).

BACKGROUND OF THE INVENTION

An important objective in the magnetic recording art has been the provision of a television recording and playback system which can be manufactured at a reasonable cost and yet which will provide quality recording and playback of television signals.

SUMMARY OF THE INVENTION

This invention relates to a wideband transducing system and method, and particularly to a system for recording and/or reproducing black and white and/or color television signals. Preferably, the related audio intelligence signals are recorded on the same track with the video signals.

The concepts of the present invention may be applied to various transducer configurations but an important contribution of the present invention resides in a system for transducing television signals including related audio signals by means of a stationary head unit which scans longitudinal tracks of the record medium. The signals may be recorded and reproduced with scanning speeds of the head relative to the record medium of the order of 120 inches per second or less and with the use of low cost tape transports, comparable in cost to present home (non-professional) type sound recorder transports. Head-to-tape scanning speeds of 60 inches per second or less are feasible in contrast to head velocities of the order of 400 to 1,500 inches per second which are typical for present rotating head systems.

It is an object of the present invention to provide an economical television transducing system such as would be particularly suitable for home or educational uses.

Another object of the invention is to provide a wideband transducer system capable of effective transducing of signals with frequency components extending into the megacycle range at head scanning speeds of 120 inches per second or less.

A further object of the invention is to provide a system for recording and/or reproducing television signals together with the related audio intelligence which is readily connected with present commercial broadcast television receiver circuitry.

Still another object of the invention is to provide a system for recording and reproducing television and audio signals with the use of broadcast receiver circuitry and a minimum number of additional low cost transistors.

Another and further object resides in a method and apparatus for high-fidelity recording and/or reproduction at low cost. A further object of the invention resides in the provision of a relatively inexpensive and simple system for recording audio signals associated with a video signal, with provision for stereo, or multiple channels for control signals or data if desired.

Other specific objects, features and advantages include reduction of hum problems, elimination of cross coupling between channels at long wavelengths, and recording and playback of video and related audio intelligence on a single track of a record medium. The same television receiver may simultaneously supply video and audio signals for recording, and display the monitored signals to facilitate recording adjustments.

Other objects, features and advantages of the present invention will be apparent from the following detailed description taken in connection with the accompanying drawings.

IDENTIFICATION OF REFERENCED PATENT SHOWING EARLIER EMBODIMENTS OF THE INVENTION

Camras U.S. Pat. No. 3,484,546 issued Dec. 16, 1969 from an application Ser. No. 545,050 filed Apr. 25, 1966 discloses earlier embodiments of the present in the 11th, 12th, 21st and 22nd figures and in the corresponding description at column 9, line 32 through column 11, line 19; column 19, line 63 through column 22, line 58; and column 23, line 11 through line 23.

DESCRIPTION OF THE SYSTEM OF FIG. 1

Figure 1:
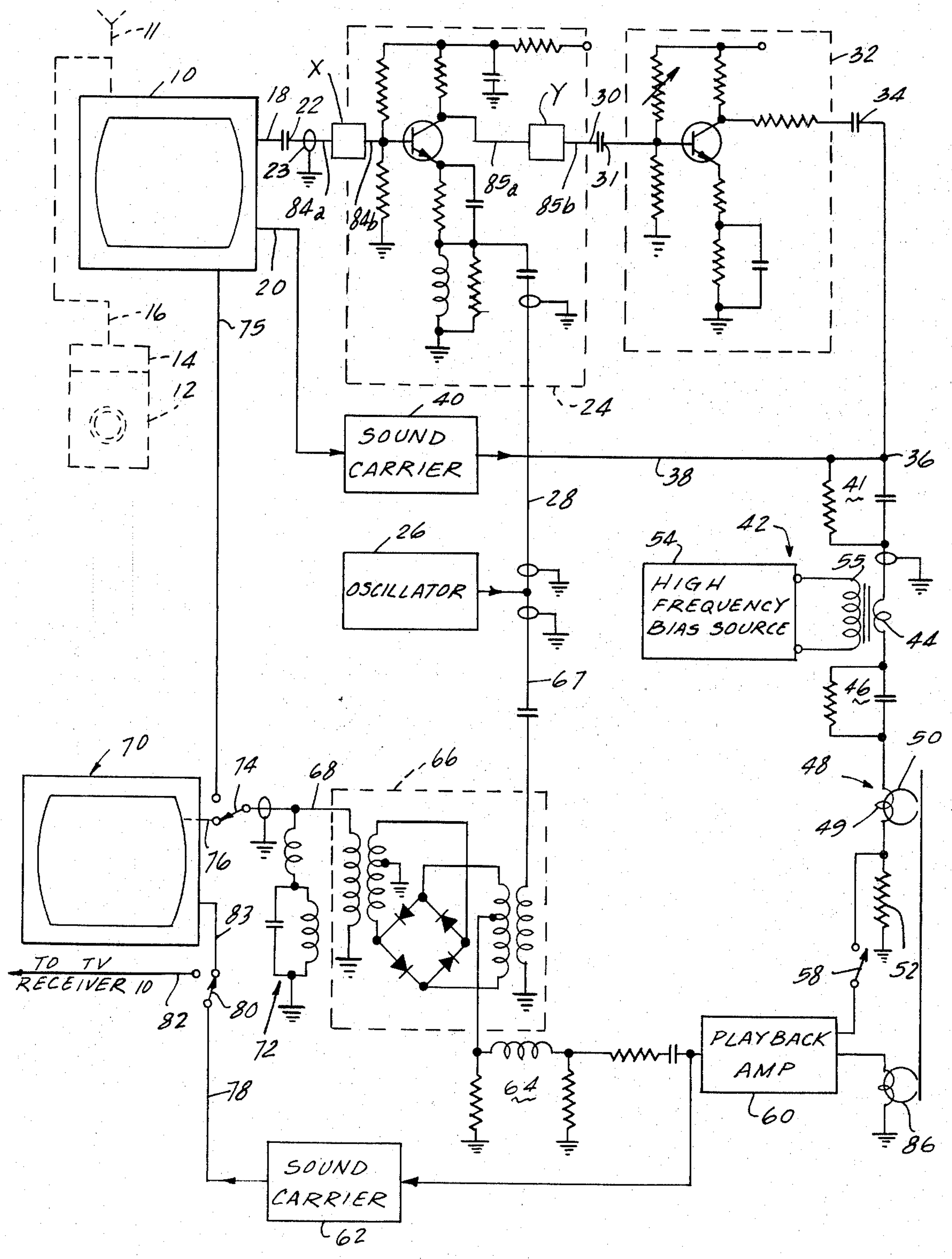
FIG. 1 is a somewhat diagrammatic illustration of an offset carrier recording and reproducing system in accordance with the present invention.

Referring to FIG. 1 there is illustrated a broadcast television receiving set 10 having an antenna 11 for receiving broadcast television signals. A television camera is indicated at 12 which may include a radio frequency generator 14 for producing a composite television signal suitable for radiation to the antenna 11 or for direct coupling to the antenna terminals as indicated by the dash line 16. Suitable color television camera systems are illustrated in my U.S. Pat. No. 3,484,546 issued Dec. 6, 1969.

Input circuitry is indicated at 18 and 20 for supplying suitable video and audio signals to the recording circuitry of FIG. 1. By way of example, conductor 18 may connect with the output of an intermediate frequency amplifier of the television set 10 so as to supply an amplitude modulated video signal as indicated at 19 in FIG. 3A having an intermediate carrier frequency (as indicated at 19*a*) of 45.75 megahertz with a full lower sideband (indicated at 19*b*), and a vestigial upper sideband (indicated at 19*c*).

The input conductor 20 may connect with the intermediate frequency audio section of the receiver so as to supply an audio frequency modulated signal having a carrier of 4.5 megahertz.

The video amplitude modulated signal is coupled by a small capacitor 22 and a shielded cable indicated at 23 to a converter circuit 24. The converter 24 may receive a local oscillator signal of the order of 46 megahertz as indicated at 25 in FIG. 3 from a local oscillator 26 as indicated by conductor 28 so as to supply an offset carrier video signal (indicated at 27 in FIG. 3B) at conductor 30 having an offset carrier frequency (such as indicated at 27*a*) which may be less than one megahertz and may be of the order of 0.4 megahertz, for example. The offset carrier video output is coupled by means of a capacitor 31 to a head driver circuit 32 whose output is coupled via a capacitor 34 to a circuit point 36 which also connects with the audio circuit 38. Audio processing circuits are indicated at 40 interposed between the input conductor 20 and output conductor 38, these audio circuits being analogous to the video circuits 24 and 26.

The composite audio-video signal is coupled via an equalizer circuit 41, and through a high frequency biasing circuit 42 including a secondary winding 44, and a further equalizer network 46 to the recording head energizing circuit 48. This circuit includes a winding 49 of record head 50 and a resistor 52. A source 54 of high frequency bias having a frequency in the range from 2 to 8 megahertz is supplied to primary winding 55 so as to supply bias current to the head energizing circuit 48 via secondary winding 44.

When a monitor switch 58 is closed, the recording voltage developed across resistor 52 is directly coupled to a monitoring or playback amplifier 60. The audio portion of the recording signal is separated and processed by means of audio processing component 62, while the video portion is transmitted via a low pass filter 64 to a playback converter circuit 66. The circuit 66 receives a local oscillator signal via conductor 67 from oscillator 26 so as to supply at coupling conductor 68 an amplitude modulated video signal on a suitable carrier for coupling to the television receiver 10, for example. A commercially available element corresponding to 66 is available from Hewlett Packard Co., Palo Alto, California, as their 10514A mixer. Thus, the reproduced and converted video signal may be coupled to an intermediate frequency circuit of the television receiver 10 or of a separate monitor television receiver or display device such as indicated at 70. A trap 72 is indicated at the output of the playback converter 66 for removing a spurious upper carrier and sideband. A switch is indicated at 74 for selectively connecting conductor 68 with conductor 75 leading to receiver 10 or with an input conductor 76 of display device 70. When a single receiver 10 is used in the monitoring mode, the IF tapped at 18 is modulated by the signal source, and is thereafter interrupted so that it does not operate the detector and video circuits directly. Instead, the processed signal from conductor 75 operates these later circuits. Additional IF amplification and/or selectivity may be inserted in line 18 or line 75 if necessary. Similarly the audio conductor 78 is connected with a selector switch 80 which in one position connects with a conductor 82 leading to television receiver 10 and in the other position connects with a conductor 83 leading to an audio reproducing circuit of display device 70.

By way of specific example, the local oscillator 26 may operate at a frequency of 46.13 megahertz to provide an offset carrier frequency of 0.38 megahertz (as indicated at 27*a*), the main upper sideband (indicated at 27*b*) of the offset carrier video signal extending to two megahertz or higher as limited by the capabilities of the recording and playback system, and with the vestigial sideband (as indicated at 27*c*) extending downwards to about 0.05 or 0.1 megahertz, for example. All frequencies in the offset carrier video are offset 0.38 megahertz from the original video intelligence, that is the video signal components of the offset carrier signal 27 are 0.38 megahertz higher than the corresponding signal components of the original video intelligence.

High frequency bias source 54 may supply high frequency bias having a frequency of 6.5 megahertz, for example.

The monitor switch 58 may be closed to aid in setting the tuning of the recording signal for optimum carrier frequency and minimum interference as observed or measured on monitor 70 or 10. Switches 74 and 80 enable the television set 10 to be used simultaneously for providing the signals to be recorded, and for monitoring the recording signal supplied to recording head 50. During monitoring, switch V disconnects the second collector video circuit W of TV set 10 from its normal IF and connects it to the output 68. An additional IF amplifier may be added for greater sensitivity.

A frequency shaping network may be inserted between conductors 84*a* and 84*b* at X at the input to converter 24 to further attenuate the vestigial sideband. This may take the form of a trap circuit tuned to inject 46.13 mHz, or the band from 46.03 to 46.50 mHz. A filter network may be inserted at Y between conductors 85*a* and 85*b* at the output of converter 24 to prevent passage of frequencies outside the bandwidth of the offset carrier video signal. For example, the circuit Y may reject frequencies above 2.2 mHz, and below 0.1 mHz.

During playback, head 50 may be connected to the playback amplifier 60, or a separate playback head 86 may be provided. The low pass filter 64 serves to remove any stray radio frequency signal, and the converter 66 may operate with a local oscillator frequency of 46.13 megahertz to provide a 45.75 megahertz picture carrier at the output 68 with modulation sidebands within the capabilities of a television receiver I F system. The upper carrier and sideband are attenuated by trip 72 while the remaining signal is fed to the intermediate frequency circuits of the playback television 10 or 70.

EMBODIMENT OF FIG. 2

Figures 2, 3:
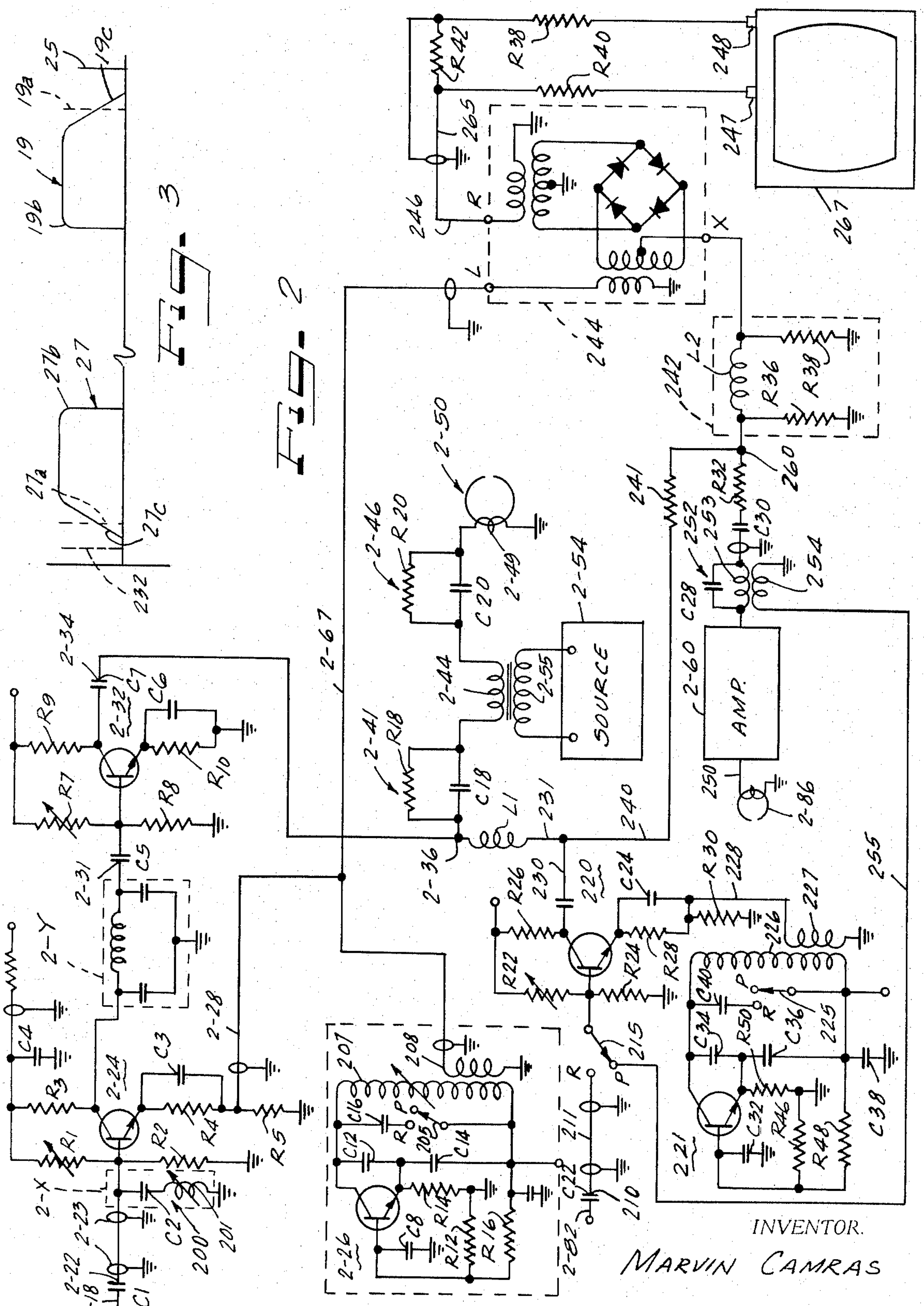
FIG. 2 is a more detailed circuit diagram showing a recording and reproducing system in accordance with the present invention.
FIG. 3 shows waveforms useful for explaining FIG. 2.

The detailed circuit of FIG. 2 represents an embodiment of the offset carrier recording and reproducing system of FIG. 1, and certain parts in FIG. 2 which have counterparts in FIG. 1 have been assigned general reference numerals including the initial number 2 corresponding to the figure number, followed by a hyphen and a two digit number corresponding to the two digit number of the part in FIG. 1. Thus, the input conductor in FIG. 2 corresponding to conductor 18 in FIG. 1 has been designated by the reference character 2–18. Similarly the coupling capacitor 2–22 corresponds to the coupling capacitor 22 in FIG. 1, and the circuit designated 2–X in FIG. 2 corresponds to the circuit indicated at X in FIG. 1.

Referring to the circuit of FIG. 2 in detail, a frequency shaping network is indicated at 200 as comprising circuit 2–X and includes a series capacitor C2 and adjustable inductance 201, the circuit 200 being tuned to resonance at the outer edge of the vestigial sideband supplied from the intermediate frequency amplifier of the conventional television receiver set 10 (FIG. 1) so as to trim or further attenuate the vestigial sideband beyond the normal attenuation thereof in the conventional television receiver set. A more complex circuit or stub line may be used for better attenuation.

As previously mentioned in reference to circuit Y in FIG. 1, a low pass network may be inserted at the output of the converter 24 and such a network is indicated in FIG. 2 at 2–Y to prevent passage of frequencies above the bandwidth of the offset video signal supplied from the converter 2–24.

Again, a more complex network may be used for better characteristics than the example shown.

The local oscillator 2–26 may be provided with a record-playback switch means 205 (shown in playback position) for providing a different operating frequency for recording and playback modes. In playback mode, the switch 205 makes contact with a terminal marked P so as to disconnect a capacitor C16 from the circuit. In the record position, the switch 205 makes contact with a terminal marked R so as to connect the capacitor C16 in the tank circuit of the oscillator. The oscillator circuit further includes a variable inductance primary winding 207 and a secondary winding 208 which is connected with the conductor 2–28 corresponding to conductor 28 in FIG. 1. By way of example, the oscillator 2–26 may operate at a nominal frequency of 46.2 megahertz in recording mode and at a frequency of 60.8 megahertz in playback mode. Thus, the offset carrier frequency at the output of converter 2–24 would be approximately 0.45 megahertz which is within the range of the recording system.

The sound signal from the sound intermediate frequency output stage of television receiver 10, FIG. 1, having a 4.5 megahertz frequency modulated carrier is supplied from the television receiver 10 of FIG. 1 to conductor 2–82, and is coupled via capacitor 210 and shielded cable 211 with a record mode terminal marked R of a record-playback selector switch 215. In recording mode, the intermediate frequency sound signal is supplied to the input of a converter 220 receiving a local oscillator signal from an oscillator 221. The oscillator 221 includes a record-playback switch 225 having a play-back terminal P and a record terminal R. In record mode, capacitor C40 is connected across the variable inductance primary winding 226 so as to provide a somewhat lower frequency than in the playback mode. By way of example, oscillator 221 may supply a nominal frequency of 4.575 megahertz during recording and 5.025 megahertz in playback mode. The output from the oscillator 221 is taken via a secondary winding 227 and is supplied to the audio converter 220 via a conductor 228. Thus, the audio offset carrier frequency at output conductor 230 from the converter 220 (indicated at 232, FIG. 3) is approximately 0.075 megahertz and is supplied to the recording head via conductor 231. The carrier is modulated according to television broadcast standards (FM in American Standard), but is at a frequency that does not interfere with the video signal and which is within the capabilities of the record-playback system.

For monitoring of the signals being recorded by head 2–50, a conductor 240 may be coupled through a resistor 241 and through a filter 242 to a mixer circuit 244. The local oscillator signal is coupled via conductor 2–67 to another terminal of the mixer 244 so that at output conductor 246 the video at the original intermediate frequency of the television receiver is available. As indicated in FIG. 1, this intermediate frequency signal may be supplied to receiver 10 via conductor 75 or to receiver 70 via conductor 76, FIG. 1. In FIG. 2, conductor 246 is shown connected with the antenna terminals 247 and 248. By analogy with the showing of FIG. 1, conductor 246 of FIG. 2 could be connected to the picture I F amplifier of television receiver 267 instead of being connected to the antenna terminals, using a switch if desired.

During playback operation, the reproduced offset carrier video-audio signal from playback head 2–86 may be supplied via conductor 250 to playback amplifier 2–60 which may preferably have a low frequency cutoff at approximately 25 kilohertz. The output from the amplifier 2–60 is supplied to a network 252 tuned to the audio offset carrier frequency, for example 0.075 megahertz. The circuit includes a primary winding 253 in shunt with a capacitor C28, and a secondary winding 254 connected via a conductor 255 with the playback terminal P of switch 215. With the local oscillator 221 operating at a frequency of 5.025 megahertz, the output from converter 220 may be a modified frequency modulation carrier signal having a carrier 4.95 megahertz which is supplied via conductor 240 and resistor 241 to a common circuit point 260 which also receives the reproduced offset carrier video signal from amplifier 2–60. With local oscillator 2–26 supplying a local oscillator signal of 60.8 megahertz, the output at line 246 will be at 61.25 megahertz video carrier and a 65.75 megahertz audio FM carrier corresponding to channel 3 of the United States television broadcast bands, so as to be capable of direct coupling via cable 265 with the antenna terminals 247 and 248 of a television receiver 267 tuned to channel 3. Other channels, locally vacant, may be chosen. By setting oscillator 2–26 at 54.8 megahertz the signal would correspond to chanel 2, while setting 2–26 at 66.8 megahertz would correspond to channel 4.

The following circuit values for the embodiment of FIG. 2 are given for the purpose of assisting those skilled in the art in practicing the present invention.

TABLE OF CIRCUIT VALUES FOR FIG. 2

| | | | |
|---|---|---|---|
| C1 | 1. picofarad (1 micromicrofarad) | C8 | 0.1 microfarad |
| C2 | 20. microfarad | C10 | .01 microfarad |
| C3 | .05 microfarad | C12 | 2. micromicrofarad |
| C4 | .05 microfarad | C14 | 15. micromicrofarad |
| C5 | .01 microfarad | C16 | (trimmer) |
| C6 | .05 microfarad | C18 | 75 microfarad |
| C7 | .001 microfarad | C20 | 300 microfarad |
| C22 | 5. picofarad | C32 | .02 microfarad |
| C24 | .05 microfarad | C34 | 30 microfarad |
| C26 | .001 microfarad | C36 | 150 microfarad |
| C30 | .002 microfarad | C40 | (Trimmer) |
| R1 | 0 to 50,000 ohms | R24 | 1500 ohms |
| R2 | 1500 ohms | R26 | 470 ohms |
| R3 | 470 ohms | R28 | 470 ohms |
| R4 | 470 ohms | R30 | 82 ohms |
| R5 | 82 ohms | R32 | 2200 ohms |
| R7 | 0 to 50,000 ohms | R34 | 2200 ohms |
| R8 | 2200 ohms | R36 | 56 ohms |
| R9 | 6600 ohms | R38 | 82 ohms |
| R10 | 560 ohms | R40 | 120 ohms |
| R12 | 2200 ohms | R42 | 5.6 ohms |
| R14 | 1000 ohms | R44 | 120 ohms |
| R18 | 15,000 ohms | R46 | 2200 ohms |
| R20 | 4700 ohms | R48 | 8200 ohms |
| R22 | 0 to 50,000 ohms | R50 | 1000 ohms |
| L1 | 220 microhenries | | |
| L2 | 4.7 microhenries | | |
| | Primary winding 226 | 40 microhenry. | |

The primary purpose of monitoring the signal by the described arrangement is to insure that the correct I F carrier frequencies of picture and sound are obtained.

Other means, preferably automatic, can also be used.

It will be apparent that many modifications and variations may be effected without departing from the scope of the novel concepts of the present invention.

I claim as my invention:

1. A system for video intelligence comprising recording a. recording means operative for recording frequency components between upper and lower frequency limits on a record medium, b. input means for supplying a carrier frequency video signal, converter means coupled with said input means for converting said carrier frequency video signal to an offset carrier video signal having an offset video carrier frequency and vestigial lower sideband frequencies and upper sideband frequencies all essentially within the frequency limits of said recording means, and c. coupling means connected with said converter means for supplying said offset carrier video signal to said recording means for recording thereof on said record medium.

2. A system in accordance with claim 1 with said input means comprising input circuit means for connection to an intermediate frequency circuit of a broadcast television receiver for supplying an intermediate frequency video signal from such television receiver to said converter means.

3. A system in accordance with claim 1 with said offset carrier video signal comprising an amplitude modulated offset carrier video signal with an offset carrier frequency of less than one megahertz.

4. A system in accordance with claim 1 with said converter means supplying an amplitude modulated offset carrier video signal with an offset carrier frequency equal to a fraction of one megahertz.

5. A system in accordance with claim 1 with a television receiver having said input means connected therewith for supplying an intermediate frequency video signal from said television receiver, and monitor means connected with said recording means for receiving said offset carrier video signal therefrom prior to recording thereof and for supplying the video intelligence thereof to said television receiver for display thereby simultaneously with the recording of the video intelligence obtained from the television receiver.

6. A system in accordance with claim 1 with means for supplying a video bias signal having a frequency of the order of 6 megahertz to said recording means during recording operation.

7. A system in accordance with claim 1 with said coupling means comprising a head driver circuit and a parallel resistance-capacitance equalizer circuit for supplying video signal current in accordance with said offset carrier video signal to said recording means.

8. A system in accordance with claim 1 with playback means for coupling to said record medium to supply an electrically reproduced offset carrier video signal, and playback converter means connected to said playback means for converting the reproduced offset carrier video signal to an intermediate frequency video signal for coupling to the intermediate frequency video circuit of a television display unit.

9. A system in accordance with claim 1 with a television receiver having an intermediate frequency signal circuit and a visual display means, and having a recording coupling circuit for selective connection with the intermediate frequency signal circuit to couple an intermediate frequency video signal from the receiver to said recording means, and having monitor circuit means for simultaneously connecting a monitor video signal from the recording means to the visual display means of the television receiver for display of the video information as supplied to said recording means.

10. A system in accordance with claim 1 with said carrier frequency video signal comprising an amplitude modulated intermediate frequency carrier having an intermediate carrier frequency of the order of 45.75 megahertz.

11. A system in accordance with claim 10 with said converter means having a local oscillator frequency of the order of 46 megahertz to provide an amplitude modulated offset carrier video signal with an offset carrier frequency equal to the difference between said local oscillator frequency and said intermediate carrier frequency.

12. A system in accordance with claim 1 with said input means supplying an amplitude modulated intermediate frequency video signal, and filter means having a cutoff frequency corresponding to a frequency below the offset carrier frequency but contiguous to the vestigial lower sideband frequencies of said offset carrier video signal and connected with the converter, means to eliminate spurious frequency components.

13. A system according to claim 12 with said filter means serving to further attenuate the frequency components of said vestigial lower sideband remote from said offset carrier frequency, said filter means being interposed between said input means and said converter means.

14. A system in accordance with claim 1 with playback means for coupling to said record medium to electrically reproduce the recorded offset carrier video signal, and playback conversion means connected with said playback means for converting the reproduced offset carrier video signal to a reproduced radio frequency carrier video signal for coupling to the radio frequency circuits of a television receiver.

15. A system in accordance with claim 14 with video playback coupling means connected with said playback conversion means for coupling said reproduced radio frequency carrier video signal to the antenna terminals of a television receiver.

16. A system in accordance with claim 1 with monitor means connected with the recording means for receiving the offset carrier video signal supplied from said converter means and for producing a visual display of the video intelligence being recorded.

17. A system in accordance with claim 16 with said recording means including a recording head energizing circuit for supplying recording signal current directly to a recording head, and said monitor means being connected directly with said recording head energizing circuit.

18. A system in accordance with claim 17 with said recording head energizing circuit including a recording head energizing winding and a resistor in series, and said monitor means being connected directly with said resistor.

19. A system in accordance with claim 1 with audio coupling means for coupling an audio signal to said recording means having a carrier frequency below said offset video carrier frequency for recording on a common channel with said offset carrier video signal.

20. A system in accordance with claim 19 with said audio coupling means supplying an audio signal having an audio bandwidth below said offset video carrier frequency.

21. A system in accordance with claim 19 with said audio coupling means comprising audio input means for coupling to a broadcast television receiver to supply an audio frequency modulation signal having a carrier frequency of about 4.5 megahertz, and comprising audio converter means for converting said audio frequency modulation signal to an offset carrier audio signal having an offset frequency modulation carrier of frequency below the frequency of said offset video carrier frequency.

22. A signal recording system comprising recording means including a record medium and having a predetermined upper frequency limit for effective recording on the record medium, a television receiver having video signal circuitry providing a video modulated carrier signal, and audio signal circuitry providing an audio modulated carrier signal, with respective video and audio carrier frequencies above said upper frequency limit of said recording means, converter circuitry for coupling with said video and audio signal circuitry of said television receiver during a recording operation for converting said video and audio modulated carrier signals with said respective video and audio carrier frequencies to lower carrier frequency video and audio signals with video and audio lower carrier frequencies less than said upper frequency limit of said recording means, and circuit means for coupling with said converter circuitry during recording operation for transmitting said lower carrier frequency video and audio signals to said recording means for recording thereof on the record medium.

23. A system according to claim 22 with said television receiver supplying a frequency modulated audio signal with an audio carrier frequency of substantially 4.5 megacycles per second, and said converter circuitry being operative for converting said frequency modulated audio signal to an carrier frequency modulated audio signal with an audio carrier frequency equal to a fraction of said audio carrier frequency of 4.5 megacycles per second.

24. A system according to claim 23 with said converter circuitry supplying a carrier frequency modulated audio signal having an audio carrier frequency not substantially exceeding 100 kilocycles per second.

25. A recording system comprising input means for supplying an amplitude modulated signal having a carrier, a full sideband, and a vestigial sideband, converter means connected to said input means for heterodyning said amplitude modulated signal to an offset carrier amplitude modulated signal occupying a lower frequency spectrum, recording means for recording a signal on a record medium, and coupling means connected with said converter means for supplying said offset carrier amplitude modulated signal to said recording means for recording thereof on said record medium.

26. A recording system in accordance with claim 25 with said recording means having a predetermined upper frequency response limit, said converter means having a local oscillator frequency above the frequency of the carrier of said amplitude modulated signal to provide an offset carrier, an upper sideband with upper sideband frequencies above the frequency of the offset carrier and below the upper frequency response limit of said recording means, and a vestigial lower sideband having frequency components below the frequency of the offset carrier.

27. A recording system in accordance with claim 25 with said converter means supplying an offset carrier amplitude modulated signal having an offset carrier with a frequency of less than one megahertz, an upper sideband with frequency components above the frequency of the offset carrier, and a vestigial lower sideband with frequency components below the frequency of the offset carrier.

28. A recording system in accordance with claim 25 with the recorded offset carrier amplitude modulated signal conveying video intelligence, a video display device having a signal input for receiving an amplitude modulated video signal having a predetermined carrier frequency playback scanning means for scanning said record medium to provide a reproduced offset carrier amplitude modulated signal, and playback converter means connected to said playback scanning means and to said signal input of said video display device for converting said reproduced offset carrier amplitude modulated signal to a converted video signal having said predetermined carrier frequency and for supplying the converted video signal to said display device for display of the video intelligence of said converted video signal.

29. A recording system in accordance with claim 25 with means interposed between said input means and said converter means for trimming the vestigial sideband prior to converting of the amplitude modulated signal to an offset carrier amplitude modulated signal.

30. A recording system according to claim 25 with means for supplying an information signal occupying said band of frequencies to said recording means for recording on a common channel of said record medium with said offset carrier amplitude modulated signal, playback means for scanning said record medium to provide a reproduced offset carrier amplitude modulated signal and a reproduced information signal, playback converter means coupled to said playback means for separating the reproduced information signal from the reproduced offset carrier amplitude modulated signal and for heterodyning the reproduced offset carrier amplitude modulated signal to a higher carrier frequency.

31. A recording system in accordance with claim 30 with said playback converter means being operative to heterodyne the separated information signal to a carrier frequency capable of being coupled directly to the modulated audio circuits of a television apparatus.

32. A recording system according to claim 25 with said coupling means comprising means interposed between the converter means and the recording means for removing a band of frequencies below the carrier frequency of the offset carrier amplitude modulated signal prior to transmission thereof to the recording means.

33. A recording system in accordance with claim 32 with means for supplying a modulated carrier signal occupying said band of frequencies to said recording means for recording on a common channel of said record medium along with said offset carrier amplitude modulated signal.

34. A recording system according to claim 32 with means for supplying a direct information signal occupying said band of frequencies to said recording means for recording on a common channel of said record medium with said offset carrier amplitude modulated signal.

* * * * *